United States Patent
Emslie

(10) Patent No.: US 9,452,714 B2
(45) Date of Patent: Sep. 27, 2016

(54) FIXING SYSTEM

(71) Applicant: Signals IT Ltd., Swinton (GB)

(72) Inventor: Peter Emslie, Swinton (GB)

(73) Assignee: Signals IT Ltd., Swinton (GB)

( * ) Notice: Subject to any disclaimer, the term of this patent is extended or adjusted under 35 U.S.C. 154(b) by 89 days.

(21) Appl. No.: 13/843,931

(22) Filed: Mar. 15, 2013

(65) Prior Publication Data

US 2013/0299660 A1 Nov. 14, 2013

(30) Foreign Application Priority Data

May 14, 2012 (GB) .................................. 1208362.2

(51) Int. Cl.
| | | |
|---|---|---|
| B60R 7/06 | (2006.01) | |
| B60R 11/00 | (2006.01) | |
| B60H 3/00 | (2006.01) | |
| B60R 11/02 | (2006.01) | |

(52) U.S. Cl.
CPC .............. *B60R 7/06* (2013.01); *B60H 3/0028* (2013.01); *B60R 11/02* (2013.01); *B60R 2011/0005* (2013.01); *B60R 2011/008* (2013.01); *B60R 2011/0052* (2013.01); *B60R 2011/0071* (2013.01)

(58) Field of Classification Search
CPC ............. B60R 7/06; B60R 7/08; B60R 7/04; B60R 2011/0005; B60R 2011/0008
USPC .......... 248/309.1, 311.2, 231.81, 316.7, 207, 248/39.1, 316.73; 224/483, 567
See application file for complete search history.

(56) References Cited

U.S. PATENT DOCUMENTS

| | | | | |
|---|---|---|---|---|
| 5,593,124 | A * | 1/1997 | Wang .................... | 248/231.81 |
| 5,961,083 | A * | 10/1999 | Hartmann et al. ...... | 248/222.14 |
| 5,979,724 | A * | 11/1999 | Loewenthal et al. ......... | 224/483 |
| 6,441,872 | B1 * | 8/2002 | Ho .................. | 224/483 |
| 2008/0210726 | A1 * | 9/2008 | Josephs .................... | 224/483 |
| 2010/0019115 | A1 * | 1/2010 | Schimmeyer .............. | 248/311.2 |
| 2010/0090076 | A1 * | 4/2010 | Brawner ............ | B60R 11/0235 248/224.8 |
| 2013/0299660 | A1 * | 11/2013 | Emslie ...................... | 248/309.1 |

FOREIGN PATENT DOCUMENTS

CN 101633341 * 1/2010

* cited by examiner

*Primary Examiner* — Tan Le
(74) *Attorney, Agent, or Firm* — Ronald E. Prass, Jr.; Prass LLP

(57) ABSTRACT

A fixing system suitable for use in a vehicle includes a main body portion and engagement means adapted for positive engagement, in use, with a part of a vehicle, wherein the engagement means comprises at least two rigidly spaced-apart engagement surfaces.

14 Claims, 4 Drawing Sheets

FIXING SYSTEM

RELATED APPLICATIONS

This application claims priority from United Kingdom patent application No.: GB 1208362.2, titled FIXING SYSTEM, filed May 14, 2012, the disclosure of which is hereby incorporated herein by reference in its entirety. This application is related to United Kingdom patent application No.: GB 1119669.8, titled (NON DAMAGE) HOOK SYSTEM TO ATTACH AN ITEM TO A VEHICLE AIR VENT OR FASCIA OR SURFACE, filed Nov. 14, 2011, the disclosure of which is hereby incorporated herein by reference in its entirety.

FIELD OF DISCLOSURE

This invention relates to a fixing system, and in particular, but without limitation, to a dashboard mount suitable for use with mobile telephones, portable computers, tablet computers and the like.

BACKGROUND

Nowadays, it is quite common for users of motor vehicles to have mobile computing and telephony devices with them. For safety reasons, it is not recommended, or indeed legal, in many countries, to hold a mobile device whilst driving. In certain industries, however, in particular in delivery and logistics, it is often important for drivers to continuously use a mobile computing device. For example, a delivery driver may be issued with a personal, portable computing device that he or she uses as: a satellite navigation and positioning system (for plotting routes between delivery destinations and for relaying instantaneous tracking data to the depot); a package barcode scanner and inventory device; a point of delivery signature recorder, etc. Such devices often need to be dashboard-mountable so that the driver of the vehicle can easily view his or her itinerary, view messages from the depot, and utilize the satellite navigation interface of the device whilst on the move.

Many portable computing devices, such as those used by delivery drivers, can be quite heavy, so a mount for it needs to be robustly manufactured and securely affixable to the dashboard or other interior surface of a vehicle.

Known solutions to the problem of mounting handheld computing devices include:

Suction-cup type mounts, that comprise a suction cup that can be used to secure a device cradle to a surface of the vehicle. These devices need to be secured to flat surfaces, so cannot often be secured to dashboards and other surfaces having, cloth, leather, textured or decorative finishes. To overcome this, the suction cup can be affixed to the vehicle's windscreen, but this can obscure the driver's view of the road, which is undesirable.

An alternative device comprises a device cradle that is screwed to a surface of the vehicle. Whilst providing a secure location for the device, this solution suffers the disadvantage of damaging the vehicle's interior, which can be unsightly and/or reduce the vehicle's re-sale value. Moreover, if different drivers utilize different devices, it can be difficult to swap the mount for one of an appropriate type.

Other device mounts comprise cradles that clip to the louvres of the dashboard vents, but these mounts have a tendency to move with the louvres, and can damage the louvres. Also, because the louvres are not intended to be structural components they can easily break under the weight of the device, especially as the vehicle traverses bumps etc. in the road. Examples of mounts that clip to vents are well known, such as those disclosed in published patent document numbers: US 2005/0236541, U.S. Pat. No. 5,593,124, US 2009/0072106, U.S. Pat. No. 6,441,872, U.S. Pat. No. 5,979,724 and CN 101633341.

Other devices, such as those described in U.S. Pat. No. 5,048,733, US 2010/0090076 and DE 202004018904, and so on, teach ways of attaching devices to other parts of a vehicle's interior, such as its headrest posts, cigarette lighter socket etc. Whilst these devices may be satisfactory in certain situations, they do not readily place the device within eyesight of the driver under normal driving conditions.

SUMMARY

A need therefore arises for an improved type of mount for devices within a vehicle.

According to a first aspect of the invention, there is provided a ridged fixing system that causes no damage to the item to which it is attached. The invention preferably uses existing, unmodified parts of a vehicle internally or externally to attach the fixing system hooks to create anchor points for a ridged or adjustable plate that when fastened together forms a ridged and solid point to locate any practical item desired in or on the vehicle. The first aspect of the invention may conveniently provide a rigid fixing point for any item where no other existing system would allow such rigidity in or on a vehicle and to become a permanent or semi-permanent addition to a vehicle. The fixing system of the first aspect of the invention preferably comprises one or more plates with hooks that fold/wrap around an existing part of a vehicle. The hooks are preferably held in place by a plate or adjustable plate, which may be extendable. The extendable and/or adjustable plate, once attached, may advantageously restrain or restrict movement in the attachment and may rigidly fix the system in place to allow the stable attachment of any device as desired.

The fixing system of the first aspect of the invention may provide a system of hooks (i.e. multiple hooks) that insert or wrap around an area or that intrude in to an area to allow attachment of a plate or adjustable bar/plate to a vehicle's air vent, dashboard, fascia, door, door card, or indeed any other part of a vehicle to allow another item, for example, a portable computer or mobile telephone, to be attached without the need to use any pre-existing screw holes, or to create any screw holes.

According to a second aspect of the invention, there is provided a fixing system suitable for use in a vehicle comprising a main body portion and engagement means adapted for positive engagement, in use, with a part of a vehicle, wherein the engagement means comprises at least two rigidly spaced-apart engagement surfaces.

Because the engagement means are rigidly spaced apart engagement surfaces, the fixing system is not held in place by spring forces, which exert continuous force or pressure on a part of the vehicle. In other words, the fixing system can be held in place by dimensionally matching the spacing of the engagement surfaces to two or more mounting locations of a vehicle, stability being derived from dimensional constraints, rather than active force applied to one or more parts of the vehicle. Possible advantages of the invention include the fact that because there are clips or other spring-biased fasteners used to secure the fixing system to the vehicle, there is no force applied continuously to the mounting locations, nor is there any residual force when the fixing system is un-loaded. Such a construction may provide a considerably more rigid location to which a device can be mounted, may reduce loading on the mounting locations, and may improve the longevity of the mounting locations.

In a most preferred embodiment of the invention, the fixing system is adapted for connection to the periphery of the surround, rather than to the louvres, of a dashboard vent. Such an embodiment avoids loading or stressing the louvres, but rather transmits the weight of the fixing system and device held by it, to a rigid part of the dashboard or fascia. This spares the vent louvres, whilst at the same time, improving the stability of the fixing system and increasing its potential loading capacity.

The main body portion preferably comprises a substantially rigid plate to which the engagement means can be detachably affixed. In a preferred embodiment of the invention, the engagement means comprise hook formations that are adapted to engage with the lip of a dashboard fascia or the surround of a dashboard vent. The hooks, where provided, are preferably manufactured by folding a relatively thin strip of metal into a U-cross-section profile, limbs of the U lying, in use, adjacent opposite sides of a fascia, and the bottom of the U engaging an edge of the fascia.

At least one of the engagement means is/are preferably detachably affixable to the main body portion, for example using screws. The main body portion may be provided with a number of spaced-apart screw holes to enable the spacing of the engagement means to be adjusted to suit differently-sized vent apertures of a dashboard.

The main body portion may be substantially flat, or it may comprise one or more dependent limb portions to which the engagement means are affixable. Such a configuration may allow the main body portion to be angled with respect to the engagement means and/or the vehicle's dashboard, for example, to present an attached device at an optimum viewing angle with respect to a driver.

A cradle may be affixed to the main body portion either permanently, for example, using an adhesive, semi-permanently, for example using screws, or detachably, for example, via a clip connector. The use of a clip connector interposed between the main body portion of the fixing system and the cradle is preferred as it may allow a common fixing system to be used with a variety of cradles for different devices, all sharing a common clip connector.

The main body portion is preferably manufactured from a strong, rigid material, such as folded, or press-formed, sheet metal.

BRIEF DESCRIPTION OF DRAWINGS

Preferred embodiments of the invention shall now be described, by way of example only, with reference to the accompanying drawings in which.

DETAILED DESCRIPTION

Figure 1:
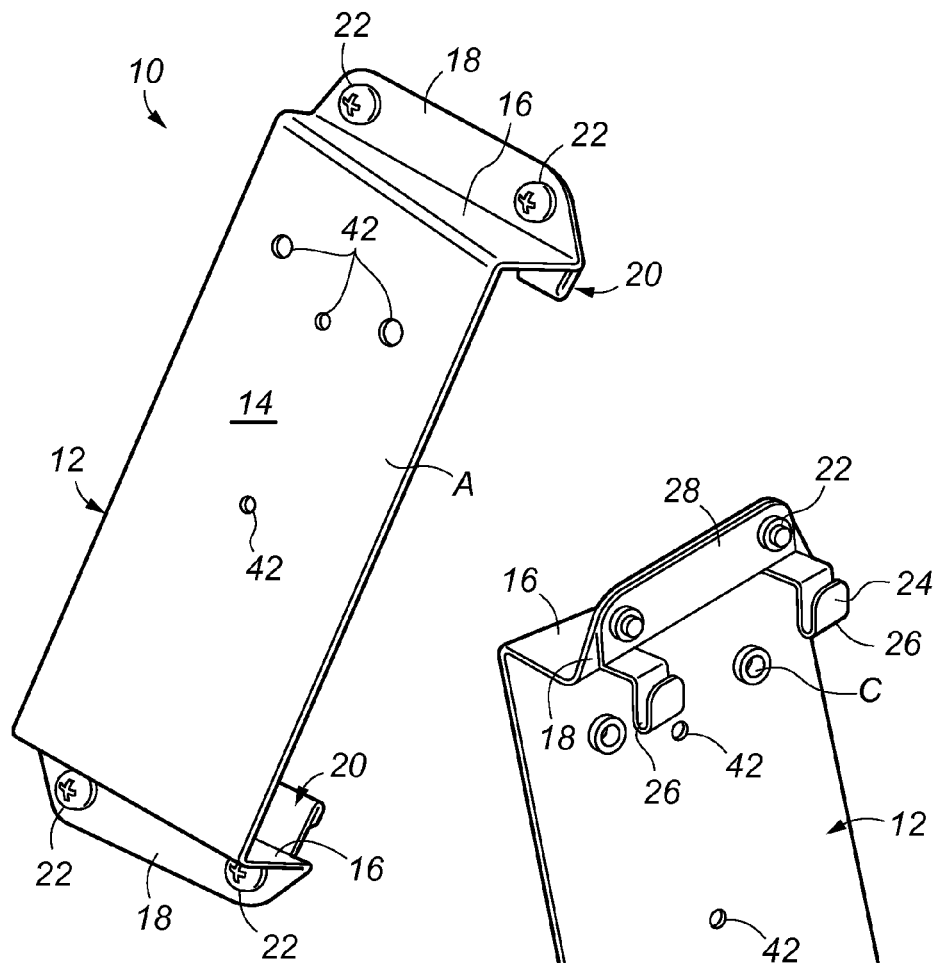
FIG. 1 is a perspective view from the front of a first embodiment of a fixing system in accordance with the invention.
Figure 2:
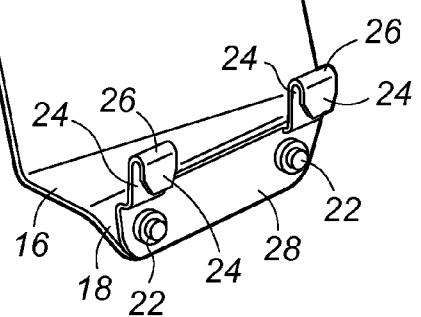
FIG. 2 is a perspective view from the rear of the fixing system of FIG. 1.
Figure 3:
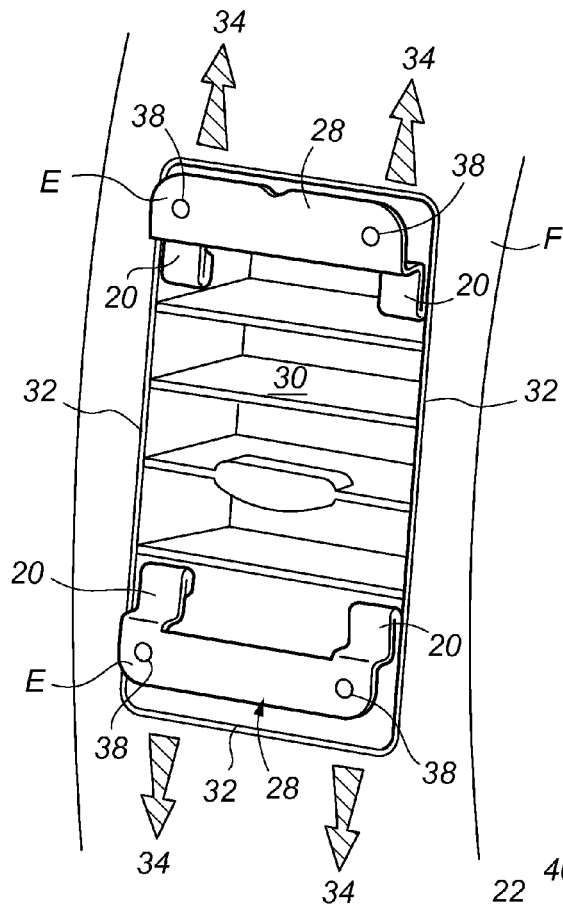
FIGS. 3 to 6 are a sequence showing how the fixing system of FIGS. 2 and 2 can be affixed to a dashboard vent surround.
Figure 4:
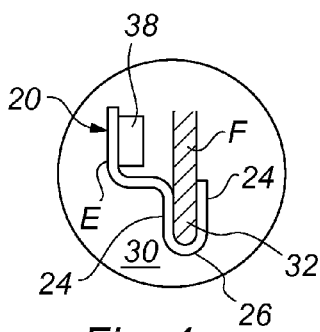

Referring to FIGS. 1 to 6 of the drawings, a fixing system 10 comprises a main body portion 12 formed from a thin folded sheet of metal having a generally rectangular, planar fixing surface 14 to which a device can be affixed as described below. The planar fixing surface 14 is folded at opposite ends to form a pair of rearwardly, and substantially perpendicularly-extending limb portions 16, which terminate in generally flat projection portions 18 to which dashboard engaging hooks 20 are affixed using screws 22.

The limb portions 16 are generally wedge-shaped such that the plane of the main fixing surface 14 is angled with respect to the plane of the hooks 20, which enables the fixing surface 14 to be angled towards a driver, when installed, and/or to compensate for curvature in a dashboard to which the fixing system 10 is affixed.

The hook 20 are formed from a sheet of folded metal, such as steel, and comprise a generally U-cross-section hook portion 22 having two spaced-apart limbs 24 interconnected by an engagement surface 26 at the base of the U. Pairs of hooks 20 are integrally formed from a single sheet of folded metal, and are joined by an integrally-formed interconnecting member 28 having through holes through which the fixing screws 22 extend to connect the hooks 20 to the main body portion 12.

Installation of the fixing device 10 is illustrated in FIGS. 3 to 6 as follows. First, the hooks 20 are separated from the fixing device and are installed in a dashboard vent aperture 30. This is accomplished by pressing the hooks 20 such that spaced apart limbs 24 of each hook are positioned on opposite sides of the periphery of the vent aperture 30. The hooks 20 are then slid, as indicated by arrows 34, so that the engagement surface 26 of each hook 20 abuts the periphery 32 of the dashboard vent aperture 30, as shown particularly, in schematic cross-section, in FIG. 4. The hooks 20 are temporarily retained in-situ by frictional forces.

Figure 5:
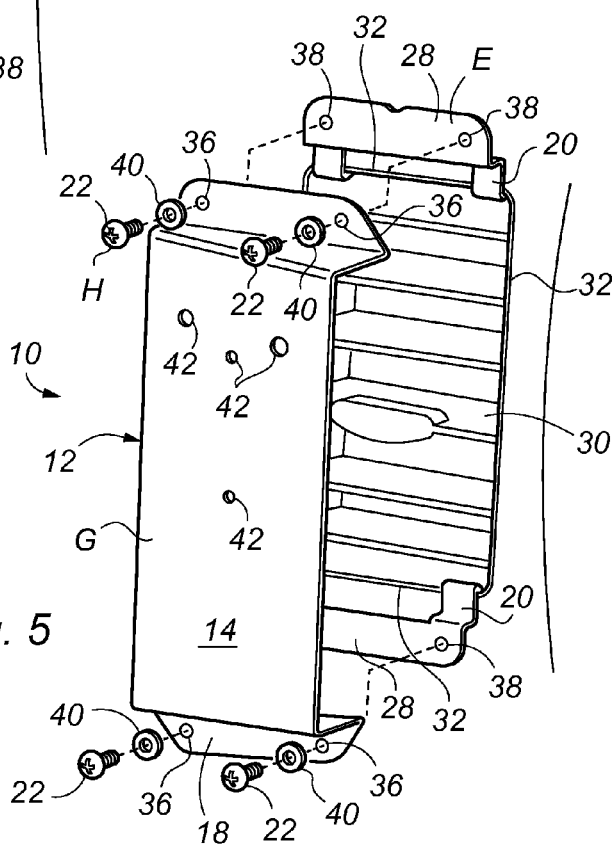
Figure 6:
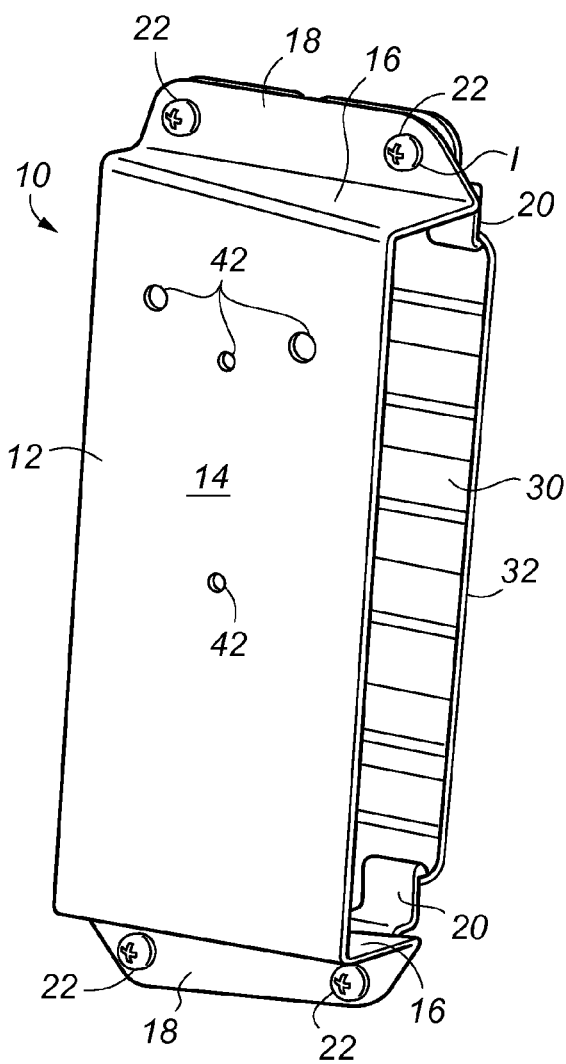

As can be seen in FIG. 5, the main body portion 12 is then offered up to the hooks 20 and the through holes of the main body portion 36 are aligned with those of the hooks 38. The main body portion 12 is then secured to the hooks 20 using screws 22, and optionally with gripping washers 40 too, that inhibit loosening of the screws 22. The final assembly is shown in FIG. 6, whereby the fixing system 10 is securely affixed to the dashboard vent 30.

The main body portion 12 has a number of pre-drilled holes 42 with which a cradle clip (not shown) can be screwed to the mount 10. Alternatively, a clip (not shown) can be glued or otherwise affixed to the main body portion 12. A device cradle (not shown) can then be detachably secured to the fixing system 10 with the minimal effort.

Stability of the fixing system 10 is achieved by ensuring that the lateral and vertical position of the hooks 20 rigidly corresponds substantially to the dimensions to the dimensions of the vent aperture 30, which prevents sliding and rotation of the fixing system 10 relative to the dashboard. Forces on the fixing system 10 are transmitted directly to the dashboard fascia, rather than via the vent itself, which makes it much stronger and more rigid that a louvre-mounted design. In addition, the vent louvres 44 can still be manipulated, albeit to a limited extent, once the fixing system 10 has been installed, which would not normally possible were the fixing system 10 to be connected to the louvres, rather than to the vent surround.

Figure 7:
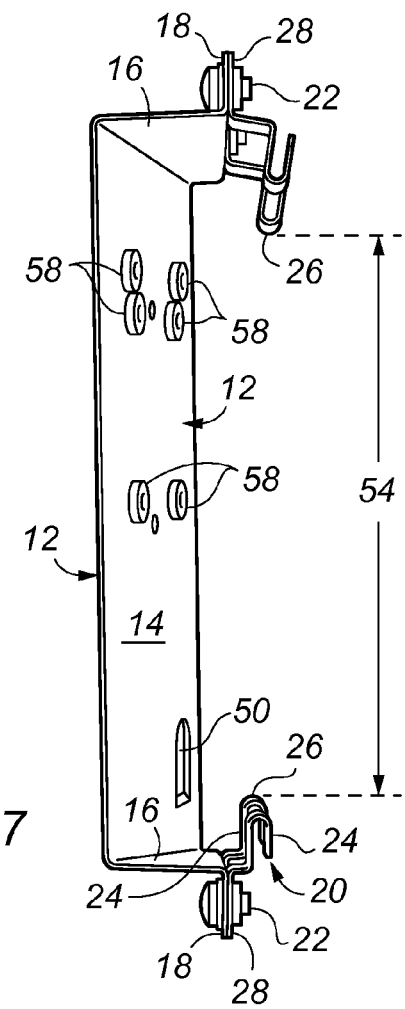
FIG. 7 is a side view of a second embodiment of a fixing system in accordance with the invention.
Figure 8:
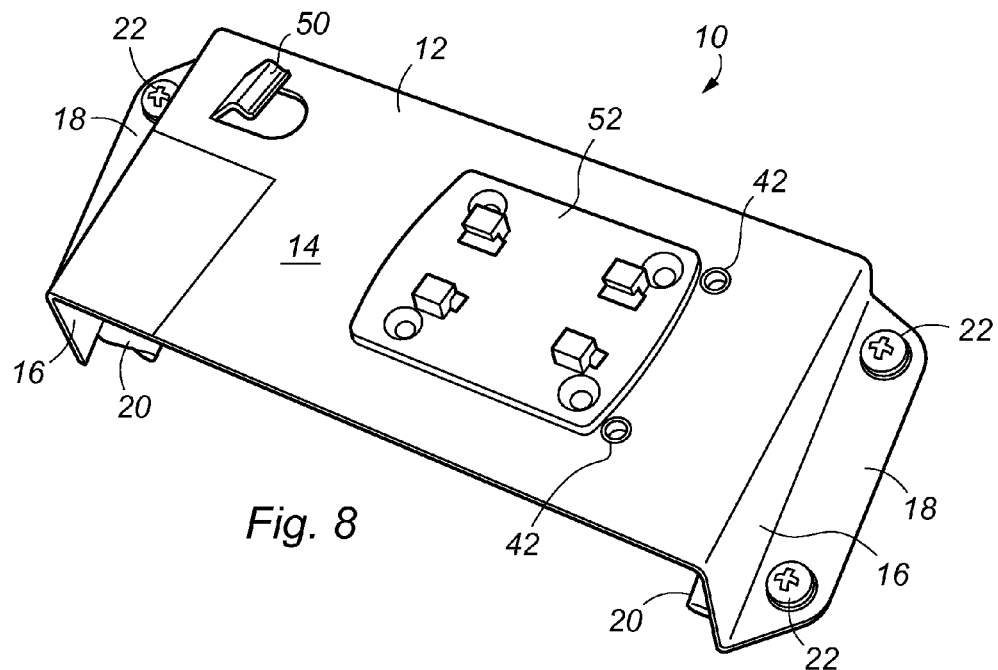
FIG. 8 is a perspective view from the front of a the fixing system of FIG. 7.
Figure 9:
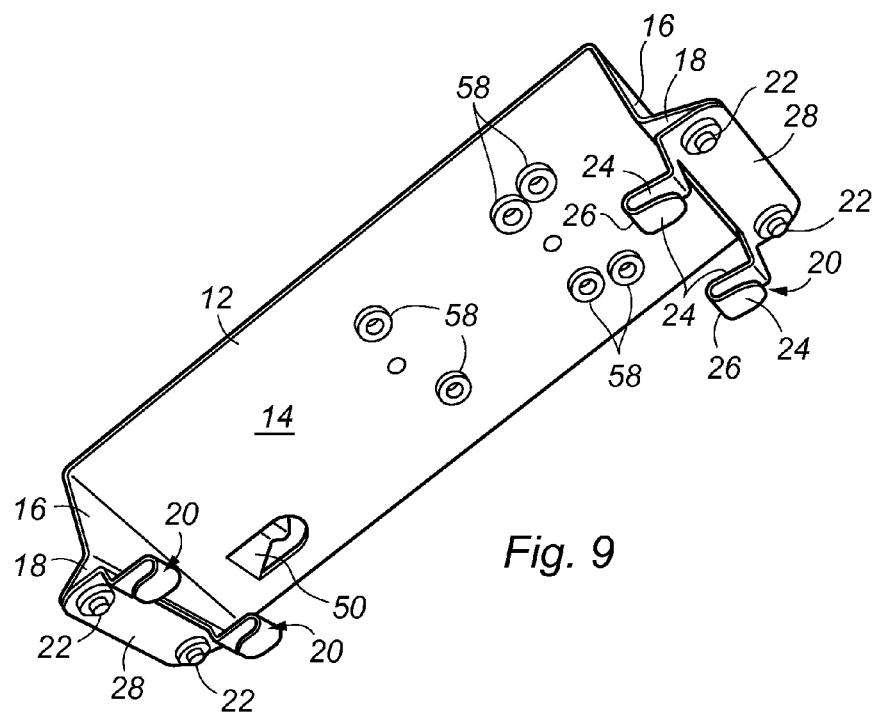
FIG. 9 is a perspective view from the rear of the fixing system of FIG. 7.

In FIGS. 7 to 9, identical features have been identified by identical reference signs for ease of understanding. The main difference between the embodiment of FIGS. 1 to 6 and FIGS. 7 to 9 being the addition of a cable clip 50 formed integrally with the main body portion 12, which can be used to retain a bight of a charging or data cable (not shown), and thus reduce loading on an electrical plug or other connector associated with the device (not shown).

In FIGS. 7 and 9, it can be seen that the mounting holes 42 of the main body portion lead to internally screw-threaded nuts 58, which are affixed to the rear surface of the main body portion 12. This enables fixing screws to be screwed directly into the main body portion, without having to use separate nuts on the rear surface. Also, it will be appreciated that a number of through holes 42 have been provided to facilitate connecting a range of cradle clips 52.

In FIG. 7 it can be seen that an industry-standard cradle clip 52 has been affixed to the fixing device, to which cradle clip 52, a range of device cradles can be detachably affixed. Also, in FIG. 7, it can be seen that the vertical spacing 54 of the hook engagement surfaces 26 is rigidly fixed by the main body portion 12, and that the lateral spacing is rigidly fixed by the cross member 28. As such, the spatial positions and relationship between the hooks 20 is substantially rigidly fixed, and can be designed to substantially correspond to the dimensions of a given dashboard vent.

The invention is not restricted to the details of the foregoing embodiments of the invention, which are merely exemplary. In alternative embodiments of the invention, there may be provided a number of set of through holes 36, 38 in the main body portion 12 or hook portions 20 to enable the fixing device 10 to be fitted to a range of vent apertures having different sizes. The shapes, dimensions and materials of construction are illustrative, and can be varied without departing from the scope of the invention. In addition, a device cradle could be affixed to the main body portion without the use of an intermediate clip, also without departing from the scope of the invention.

What is claimed is:

1. A fixing system suitable for use in a vehicle, the fixing system comprising:
    a main body portion comprising a substantially rigid plate;
    a first engagement means that is configured to be affixed to a first edge of the main body portion; and
    a second engagement means that is configured to be affixed to a second edge of the main body portion opposite the first edge of the main body portion in plan view,
    at least one of the first engagement means and the second engagement means being further configured to be detachably affixed to the main body portion,
    each of the first engagement means and the second engagement means
        being configured for positive engagement with a periphery of a vent aperture of a vehicle, and
        comprising at least two rigidly spaced-apart hooks each having a generally U-shaped cross section, each U-shaped cross section comprising two spaced-apart limbs interconnected by an engagement surface at the base of the U of the U-shaped cross section,
    the engagement surfaces of the spaced-apart hooks of the first engagement means being arranged to face in an opposite direction the engagement surfaces of the spaced-apart hooks of the second engagement means such that the spaced apart limbs of the respective spaced-apart hooks are located on opposite side of the periphery of the vent aperture with the respective engagement surfaces abutting the periphery.

2. A fixing system as claimed in claim 1, wherein the fixing system is held in place by dimensionally matching the spacing of the engagement surfaces of the spaced-apart hooks of the first engagement means and the engagement surfaces of the spaced-apart hooks of the second engagement means to two or more mounting locations on the periphery of the vent aperture of the vehicle.

3. A fixing system as claimed in claim 1, wherein the periphery of the vent aperture is a surround of a dashboard vent.

4. A fixing system according to claim 1, wherein the substantially rigid plate is adjustable or extendable.

5. A fixing system according to claim 1, wherein the respective spaced-apart hooks are formed from a sheet of folded metal.

6. A fixing system according to claim 5, wherein pairs of hooks of each engagement means are integrally formed from a single sheet of folded metal, and are joined by an integrally-formed interconnecting member.

7. A fixing system as claimed in claim 1, wherein the main body portion is detachably affixed to at least one of the first engagement means and the second engagement means by screws passing through pre-drilled screw holes in the main body portion, lateral positions and vertical positions of the respective spaced-apart hooks being substantially fixed and selected to substantially correspond to dimensions of the periphery of the vent aperture.

8. A fixing system according to claim 1, wherein at least one of the first engagement means and the second engagement means is configured to be affixed at more than one location on the main body portion.

9. A fixing system according to claim 1, wherein the main body portion is substantially flat.

10. A fixing system according to claim 1, wherein the main body portion comprises one or more limb portions to which at least one of the first engagement means and the second engagement means are affixed.

11. A fixing system according to claim 1, further comprising a device cradle affixed to the main body portion.

12. A fixing system according to claim 1, further comprising a cable clip.

13. A fixing system according to claim 12, wherein the cable clip is integrally formed with the main body portion.

14. A fixing system according to claim 1, further comprising a cradle clip.

* * * * *